United States Patent
Langer et al.

(10) Patent No.: US 10,437,232 B2
(45) Date of Patent: Oct. 8, 2019

(54) METHOD FOR PRODUCING A PADDING FOR TRANSPORTING CARGO

(71) Applicant: Deutsche Post AG, Bonn (DE)

(72) Inventors: Frank Langer, Troisdorf (DE); Holger Schneebeck, Cologne (DE); Patrick Unterberg, Witten (DE)

(73) Assignee: Deutsche Post AG, Bonn (DE)

( * ) Notice: Subject to any disclaimer, the term of this patent is extended or adjusted under 35 U.S.C. 154(b) by 241 days.

(21) Appl. No.: 15/398,883

(22) Filed: Jan. 5, 2017

(65) Prior Publication Data
US 2017/0192413 A1    Jul. 6, 2017

(30) Foreign Application Priority Data
Jan. 5, 2016   (DE) ........................ 10 2016 100 133

(51) Int. Cl.
    *G05B 19/4099*     (2006.01)
    *B33Y 10/00*     (2015.01)
    (Continued)

(52) U.S. Cl.
    CPC .......... *G05B 19/4099* (2013.01); *B33Y 10/00* (2014.12); *B33Y 50/00* (2014.12);
    (Continued)

(58) Field of Classification Search
None
See application file for complete search history.

(56) References Cited

U.S. PATENT DOCUMENTS 6,460,313 B1 *   10/2002   Cooper ................ B31D 5/0073
                                                                     53/493
2001/0017023 A1    8/2001   Armington
(Continued)

OTHER PUBLICATIONS

Chuchom Somchai et al: An Integrated Design Approach for Protective Packaging, Integrated Manufacturing Sys, IFS Publications. Kempston, GB, 2000, pp. 321-330.
(Continued)

*Primary Examiner* — Bernard G Lindsay
(74) *Attorney, Agent, or Firm* — Woodard, Emhardt, Henry, Reeves & Wagner, LLP (57) ABSTRACT

This disclosure relates to a method for producing a padding for transporting general cargo in an outer packaging using a computer, a 3D scanner and/or a padding machine by obtaining 3D data of a 3D CAD model and material data for each item of cargo from a database and/or by three-dimensional scanning of the cargo with the 3D scanner, sorting the cargo on the basis of the 3D CAD data and the material data into an existing transport category or into a transport category that is created, grouping the items into a cargo group on the basis of the transport category and/or the general cargo ID, virtually arranging the cargo group in the outer packaging, selecting a 3D CAD model of a padding template based on the virtual arrangement, calculating a difference, a break and/or an association between the virtual arrangement of the cargo group in the selected 3D CAD model of the padding template and the 3D CAD model of the selected padding template, the 3D CAD model of the cargo and the coordinates and orientation of the 3D CAD model of the cargo as 3D CAD model of a virtual padding, and producing the padding from the 3D CAD model of the virtual padding with the padding machine.

20 Claims, 6 Drawing Sheets

(51) Int. Cl.
*B33Y 50/00* (2015.01)
*G06F 17/50* (2006.01)
*B29L 31/00* (2006.01)

(52) U.S. Cl.
CPC ........ *G06F 17/50* (2013.01); *B29L 2031/712* (2013.01); *G05B 2219/35134* (2013.01); *G05B 2219/49007* (2013.01); *G06F 2217/38* (2013.01)

(56) References Cited

U.S. PATENT DOCUMENTS

| | | |
|---|---|---|
| 2005/0055181 A1 | 3/2005 | Verdura |
| 2006/0127648 A1 | 6/2006 | De Luca |
| 2010/0086721 A1 | 4/2010 | Batchelder |
| 2010/0256790 A1* | 10/2010 | Teran-Matus ........... G06F 17/50 700/98 |
| 2014/0067104 A1* | 3/2014 | Osterhout .............. G06Q 50/28 700/97 |
| 2016/0059489 A1* | 3/2016 | Wang ..................... H04L 67/16 700/119 |

OTHER PUBLICATIONS

Lye S W et al: Virtual Design and Testing of Protective Packaing Buffers, Science Direct, Computers in Industry 54 (2004), Elsevier, Amsterdam, NL, Jun. 2, 2004, pp. 209-221.
Wikipedia, 3D Scanner Jan. 1, 2017.
Wikipedia: Laser Scanning, Version Nov. 17, 2015.

* cited by examiner

METHOD FOR PRODUCING A PADDING FOR TRANSPORTING CARGO

CROSS-REFERENCE TO RELATED APPLICATION

This application claims the foreign priority benefit of German Patent Application No. 10 2016 100 133.3 filed Jan. 5, 2016, which is hereby incorporated by reference.

BACKGROUND

The invention relates to a method for producing a padding for transporting general cargo in an outer packaging, comprising the following step carried out by a computer, a 3D scanner and/or a padding machine: obtaining 3D data of a 3D CAD model and material data for each item of general cargo by transfer from a database and/or by three-dimensional scanning of the general cargo by means of the 3D scanner.

When collating and then packing goods in a warehouse, a packing strategy is generally applied which aims to fill standardised packing sizes, such as parcels or pallets. The individual items of general cargo are placed in an outer packaging which is then filled up with a padding, which often consists of filling material. The used filling material is generally loose material, such as plastic balls, straw, or paper balls, so as to uniformly fill out an unused volume in the outer packaging. Due to the filling material, the items of general cargo are padded and fixed in the outer packaging in order to avoid damage thereto during transport. Alternatively or additionally, customised, individual filling material can be used, however this is generally used only with outer packaging of individual items and sales units and is produced directly by the manufacturer.

During transport, many goods are damaged in spite of all this on account of insufficient or absent padding and are returned as a result. A primary reason lies in the standardised padding, which is not suitable for the particular transport requirements of the goods. Particular difficulties are encountered in the grouping of fragile and heavy goods in one parcel. This is because current processes in a warehouse or fulfilment centre often do not allow customised consideration of the particular goods or grouping thereof in a parcel on account of the speed of the picking when collating said goods.

SUMMARY

On the basis of this situation, the object of the invention is to specify a method for creating a padding for the transport of general cargo in an outer packaging in a particularly simple and customised manner.

The object is achieved by the features of the independent claim. Advantageous embodiments are specified in the dependent claims.

The object is therefore achieved by a method for producing a padding for transporting general cargo in an outer packaging, comprising the following steps carried out by a computer, a 3D scanner and/or a padding machine:

b) obtaining 3D data of a 3D CAD model and material data for each item of general cargo by transfer from a database and/or by three-dimensional scanning of the general cargo by means of the 3D scanner, c) sorting the general cargo by means of a first neural network into an existing transport category where applicable or into a transport category that is to be created, wherein the cargo item is categorised by the first neural network on the basis of the 3D data and the material data, d) grouping the general cargo into a general cargo group on the basis of the transport category and/or a general cargo ID, e) arranging the general cargo group, virtually, in the outer packaging, f) selecting a 3D CAD model of a padding template for the general cargo group by means of a second neural network on the basis of the transport category and the virtual arrangement, g) calculating a difference, a break and/or an association between the virtual arrangement of the general cargo group in the selected 3D CAD model of the padding template, the 3D CAD model of the general cargo and coordinates and orientation of the 3D CAD model of the general cargo, and the 3D CAD model of the selected padding template as 3D CAD model of a virtual padding, n) producing the padding from the 3D CAD model of the virtual padding by means of the padding machine.

As a result of the method, a completely new approach is proposed for producing a padding for the packing and consolidation of items of general cargo to be shipped, in accordance with individual transport requirements. The neural networks provide an automatic assessment of the transport requirements for the particular general cargo and also a selection and creation of a corresponding, customised padding. Due to the padding adapted individually in this way to the item of general cargo or a plurality of items of general cargo, damage sustained during transport and returns is significantly reduced, and therefore less waste and scrap is produced. Particularly in the case of valuable items of general cargo, the reduction of returns is of great economical relevance. In addition, the proposed method makes it possible to cater individually to customer wishes and to finish a packaging of the items of general cargo with the aid of the padding by structure, aesthetics and arrangement. The individual adaptation of the padding to the transport requirements and the resultant fixing of the general cargo also means that, in contrast to methods known from the prior art, it is not necessary to fill out the entire unused volume in the outer packaging with further filling material, which reduces the overall usage of filling material. Lastly, recyclable materials such as cellulose or starch can also be used in order to produce the padding in an environmentally sound manner.

In principle, a padding for an individual item of general cargo and also a plurality of items of general cargo shipped in a common outer packaging and also for any type of general cargo can be produced by the method. The general cargo can be, for example, a container, food or shoes, but also crates, loaded pallets, machine or plant parts, rolls of cable, paper or sheet metal, and barrels, and can have any form in principle. The synonymous international term for general cargo is freight, wherein the general cargo can also be formed by bulk products and is also referred to as consolidated cargo. The outer packaging in particular constitutes a casing or a partial or complete wrapping of the general cargo so as to protect it against external influences and damage. The method can be performed after the arrival of an order for the picking and shipping of the items of general cargo and also beforehand with the arrival and sorting of the items of general cargo at a warehouse so as to provide the items of general cargo that are to be stored with the padding or so as to prepare said items for storage.

In step b) it is preferably checked whether a transport category has already been defined for the particular general cargo. For this purpose, the material data, 3D CAD data of the general cargo, and, if provided, also master data can be retrieved, from a database, for all items of general cargo on a picking list, or can be sent to a memory of the computer. If there is no 3D CAD data provided for the general cargo, this data can be obtained by three-dimensional scanning of the general cargo by means of the 3D scanner. In steps c) and f) any neural network can be used in principle. The sorting and selection are performed by the self-learning system of the neural network by means of what is known as "deep learning (DL)", wherein a validation by an authorised individual or a training of the neural network may also be necessary initially. Tests have shown that the neural network also enables a fully automated and correct sorting and selection once a training phase has been performed. The categorisation performed in step c) is preferably stored in the database.

The general cargo group in step d) takes on preferably consolidated data of the individual items of general cargo. The grouping of the items of general cargo can be controlled via the transport category or the general cargo ID of the general cargo, also referred to as article ID, in a client-specific manner with a grouping strategy. In step g) the general cargo group is positioned virtually in the selected padding template in accordance with the calculated general cargo arrangement. This means in particular that the CAD model of the general cargo is inserted virtually with the coordinates and orientation calculated from the 3D data into the CAD model of the padding template. In this respect, the coordinates and orientation are to be understood as part of the 3D data. Gaps for the items of general cargo can be inserted into the virtual padding by difference, break and/or association of the CAD model of the general cargo with the CAD model of the padding template. Lastly, in step n), the padding is produced from the 3D CAD model of the virtual padding by means of the padding machine. When the general cargo is inserted into the padding, the padding bears preferably and/or in part with contact against the general cargo. Once the padding has been created, a creation order can be marked as complete.

In accordance with a development, the method comprises the following step: a) transferring a picking order and/or a storage list comprising the item of general cargo or a plurality of items of general cargo and in particular delivery data for each item of general cargo and/or a labelling for each item of general cargo, and/or wherein step b) also comprises the acquirement of master data for each item of general cargo and the categorisation in step c) is performed on the basis of the master data, and/or the categorisation in step c) is stored in a database.

By means of step a) the picking order or a picking list or the storage list with associated articles, delivery data and messages to be applied individually, etc. can be sent to the memory of the computer.

In principle, there are various possibilities for arranging the general cargo group in the outer packaging in step e). However, in accordance with a particularly preferred development, step e) comprises the steps of:

e1) calculating a volume of the general cargo group with regard to a standard size of the outer packaging and with regard to a pre-sorting on the basis of a determined transport strategy as pre-selection of the padding, e2) checking, in relation to at least one limit value, whether the pre-selection of the padding can be created, in particular comprising the creation of a production sequence for the padding depending on an available machine fleet, a required period of time, a value and/or a fragmentation of the sequence, e3) comparing the pre-selection of the padding with arrangements, already created, of items of general cargo having the same transport category, number of general cargo groups and/or total or joint volumes, e4) initially arranging the general cargo in a level in the grid dimension of the general cargo group, and e5) optimising the initial arrangement by means of a threshold accepting algorithm, great deluge algorithm, metropolis algorithm, morphological, evolutionary and/or genetic algorithm in order to obtain the virtual arrangement.

In step e) the general cargo group is arranged virtually in the outer packaging, preferably in a number of sub-steps. Firstly, in sub-step e1), a pre-selection of feasibility is made on the basis of the determined transport strategy, wherein a rough calculation as necessary of the entire volumes of the general cargo group or all general cargo groups is compared with the packing targets constituted by standard size and pre-sorting. The comparison is performed on the basis of an availability of standard sizes and a selection thereof and whether the general cargo group fits well, barely, or not at all into the standard size. If the general cargo group only barely fits into the standard size, a morphogenetic arrangement is preferably provided. If the general cargo group does not fit into the standard size, another standard size or a separation into two picking lists can be selected. Otherwise, it is possible to check by a pre-sorting whether the separate dispatch of the cargo groups, for example with a different shipping method, is more favourable. If so, the picking list can be divided accordingly and fed in again.

In step e2), a calculation is made versus external and internal limit values as to whether the padding will be created. To this end, it is possible to calculate whether a padding is necessary in the transport category. In addition, for each general cargo group it is possible to compare whether a joint value is sufficient with a client-specific (as necessary) maximum material value of the padding of the corresponding general cargo group or the article ID. The joint value can additionally be compared with a maximum period of time of the picking process. In addition, a maximum period of time for the creation of the padding can be calculated in accordance with available padding machines. Lastly, a maximum period of time of the picking process with number of paddings can be calculated.

In sub-step e3) a comparison is made with arrangements already created having the same transport categories, number of general cargo groups, and total or common volumes. In sub-step e4), general cargo groups having common priority objects and/or joint accessibility can preferably be assigned to an uppermost level, whereas general cargo groups having the greatest joint weight are assigned to the lowermost level.

Lastly, in sub-step e5), a calculation of the arrangement is preferably made within a grid dimension of for example 30 ccm, 15 ccm or 7.5 ccm by "simulated annealing" heuristic optimisation algorithms, such as threshold accepting, great deluge algorithm or metropolis algorithm, on the basis of the joint volume of the general cargo groups and joint transport category and/or within a general cargo group on the basis of the volume primitive shape and outer volume dimensions of the general cargo, by morphological or evolutionary/genetic algorithms on the basis of the CAD model of the general cargo groups and/or on the basis of the CAD model of the general cargo. Whereas the first-mentioned algorithm group is advantageous with simple shapes, loose general cargo or compartment systems and floor-to-ceiling trays, the second-mentioned group of algorithms is advantageous with shapes that are more complex by comparison. Due to the algorithms, an optimal solution can be determined iteratively, wherein loops can be performed between the general cargo arrangement within a group and the arrangement of the general cargo groups.

In a preferred development the selection in step f) is performed on the basis of a transport strategy, an available machine fleet, a customisation strategy and/or a picking order and/or a storage list. In accordance with a further preferred embodiment the method comprises the step h) of adapting the 3D CAD model of the virtual padding in respect of a customisation strategy of the general cargo, in particular selected from a surface finishing, a labelling, a coding and/or an electronic circuit on the padding. The customisation produced as a result can be achieved by an imprint in the padding with a 3D printer and/or downstream printing on the surface of the padding or integration into the 3D CAD model. By way of example, the padding can be customised by surface finishing, such as texture, relief and colour, messages, such as images, graphics, text and personalised text, codings, such as barcodes, QR codes, numerical codes, serial numbers, or electronic circuits, such as radio electronics, sensor electronics, or sealing electronics.

In accordance with another preferred development, the method comprises the step i) generating a machine-processable 3D CAD model for the padding machine from the 3D CAD model of the virtual padding, in particular by removing faults, holes, unnecessary intermediate steps and/or unassociated vertices, and storing the 3D CAD model of the virtual padding in a database. For example for the picking order, the generated 3D CAD model of the virtual padding is corrected by means of this step of any faults, holes and unassociated vertices and is prepared to as to be machine-processable, for example by deleting any data from the intermediate steps that is no longer necessary. The machine-processable 3D CAD model for the padding machine is preferably stored in the database or is sent to the memory of the computer in order to create the padding. The virtual commissioning of the padding and the physical creation of the padding can be provided at the same location or at separate locations. A transfer of a print order via the picking list or incoming goods list can be implemented on-demand or by push methodology. Accordingly, a plurality of independent computers and/or databases can also be provided in order to carry out the method, which computers and/or databases are remotely connected to one another wirelessly via the Internet or in a wired manner.

In another preferred development the method comprises the step j) obtaining an order for production of the padding as part of a picking order and/or a storage list and calling up, from the database, the 3D CAD model of the virtual padding corresponding to the order, k) creating an order list of the paddings to be produced and assigning general cargo IDs to the paddings to be produced, in particular depending on an available machine fleet, a required period of time, a value and/or a fragmentation of the sequence, l) adding the general cargo ID to the 3D CAD model of the virtual padding, and/or m) transferring the 3D CAD model of the virtual padding to the padding machine.

In step j) one or more print orders, in particular the picking list/incoming goods list, comprising the associated articles, delivery data and messages to be applied individually, etc. can be sent to the memory of the computer as an order, and the associated 3D CAD data of the padding can be loaded from the database into the memory. In step k) the paddings to be created can be assigned article IDs, which are integrated into the picking list or preparation instructions for the padding machine. In step l) a padding machine-specific adaptation of the 3D CAD model of the padding can be performed in order to add the article ID of the padding to the 3D CAD model of the padding. Depending on the type of padding, this article ID can be applied to the padding as a message to be applied individually. Lastly, in step m), the 3D CAD model of the padding can be transferred to the associated padding machine or can be transferred in steps to the padding machine into the memory.

In accordance with yet another preferred development, the method comprises the following step: o) inserting the padding into the outer packaging and inserting the general cargo into the padding and closing the outer packaging by means of a packing machine, or o") inserting the general cargo into the padding, storing the general cargo inserted into the padding, removing from storage the general cargo inserted into the padding, inserting the general cargo inserted into the padding into the outer packaging and/or and closing the outer packaging by means of a packing machine, and in particular p) transferring the closed outer packaging to a logistics service provider for delivery to a recipient of the general cargo. The picking list or preparation instructions for the incoming goods can be extended by the article ID of the created padding and sent to a warehouse system.

In principle, the padding machine can be formed arbitrarily. In accordance with a particularly preferred embodiment, however, the padding machine is embodied as a 3D printer, trimmer, cutter, press, stamping machine, thermoformer and/or box-folding machine.

The invention will be explained in greater detail hereinafter with reference to the accompanying drawings, in which:

DETAILED DESCRIPTION OF THE DRAWINGS

Figure 1A:
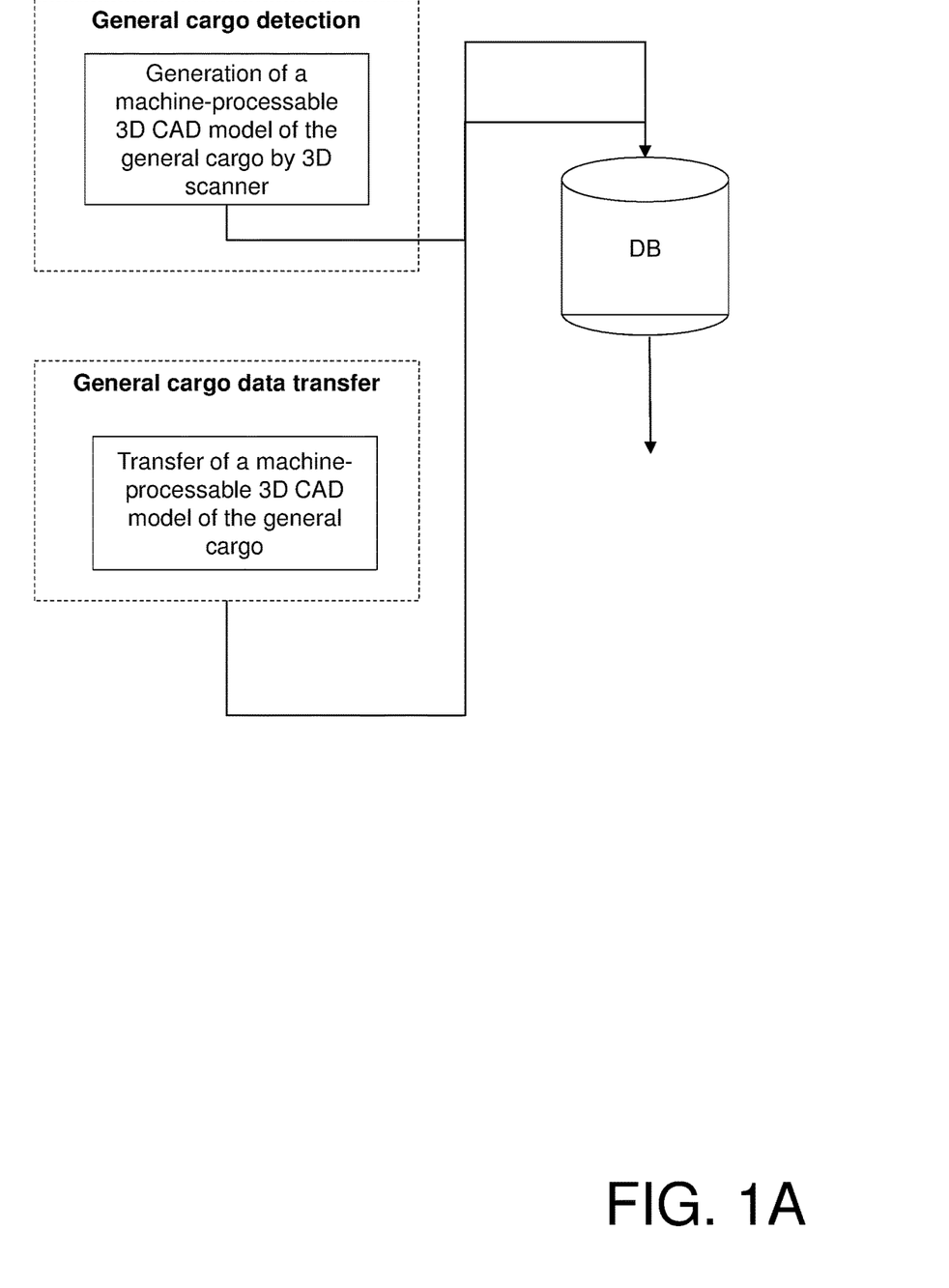
FIGS. 1A to 1D show a process view of a method for producing a padding in accordance with a preferred exemplary embodiment of the invention.
Figure 2:
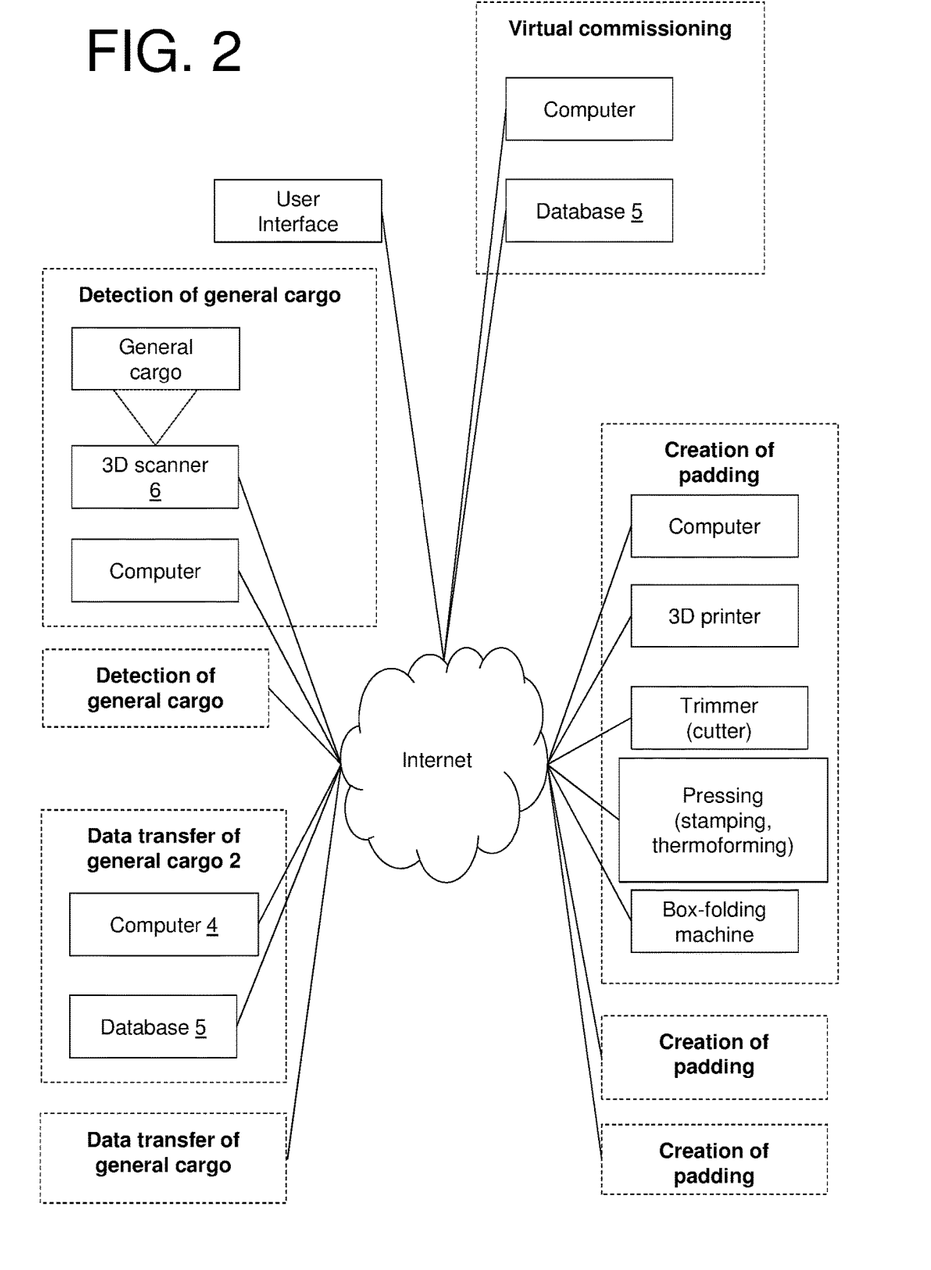
FIG. 2 shows a system view of a system for carrying out the method according to FIGS. 1A to 1D.
Figure 3:
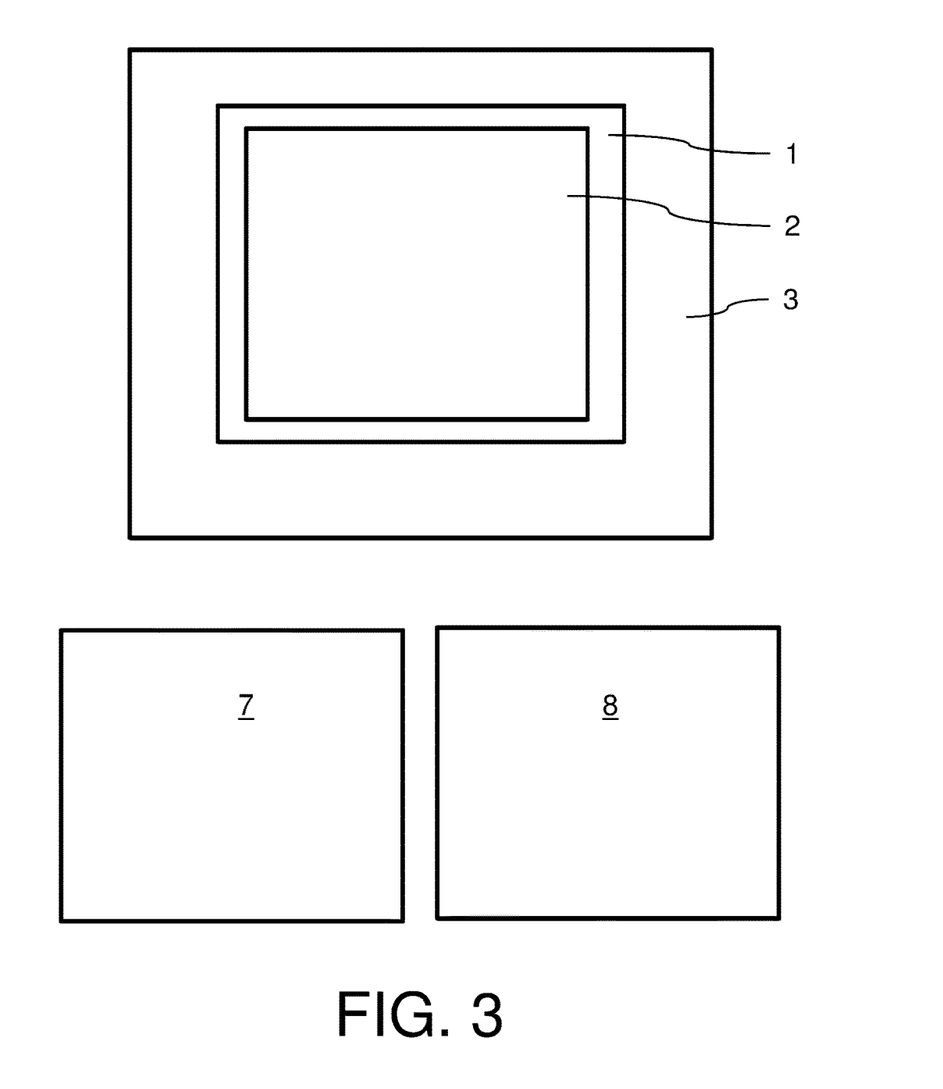
FIG. 3 shows a schematic view of a padding produced by means of the method according to FIGS. 1A to 1D for transporting general cargo in an outer packaging.

FIGS. 1A to 1D show a process view of a method for producing a padding 1 for transporting general cargo 2 in an outer packaging 3 in accordance with a preferred exemplary embodiment of the invention. A system view of a system for carrying out the method according to FIGS. 1A to 1D is illustrated in FIG. 2, whereas FIG. 3 shows the padding 1 produced by means of the method according to FIGS. 1A to 1D for transporting the general cargo 2 in the outer packaging 3.

Figure 1B:
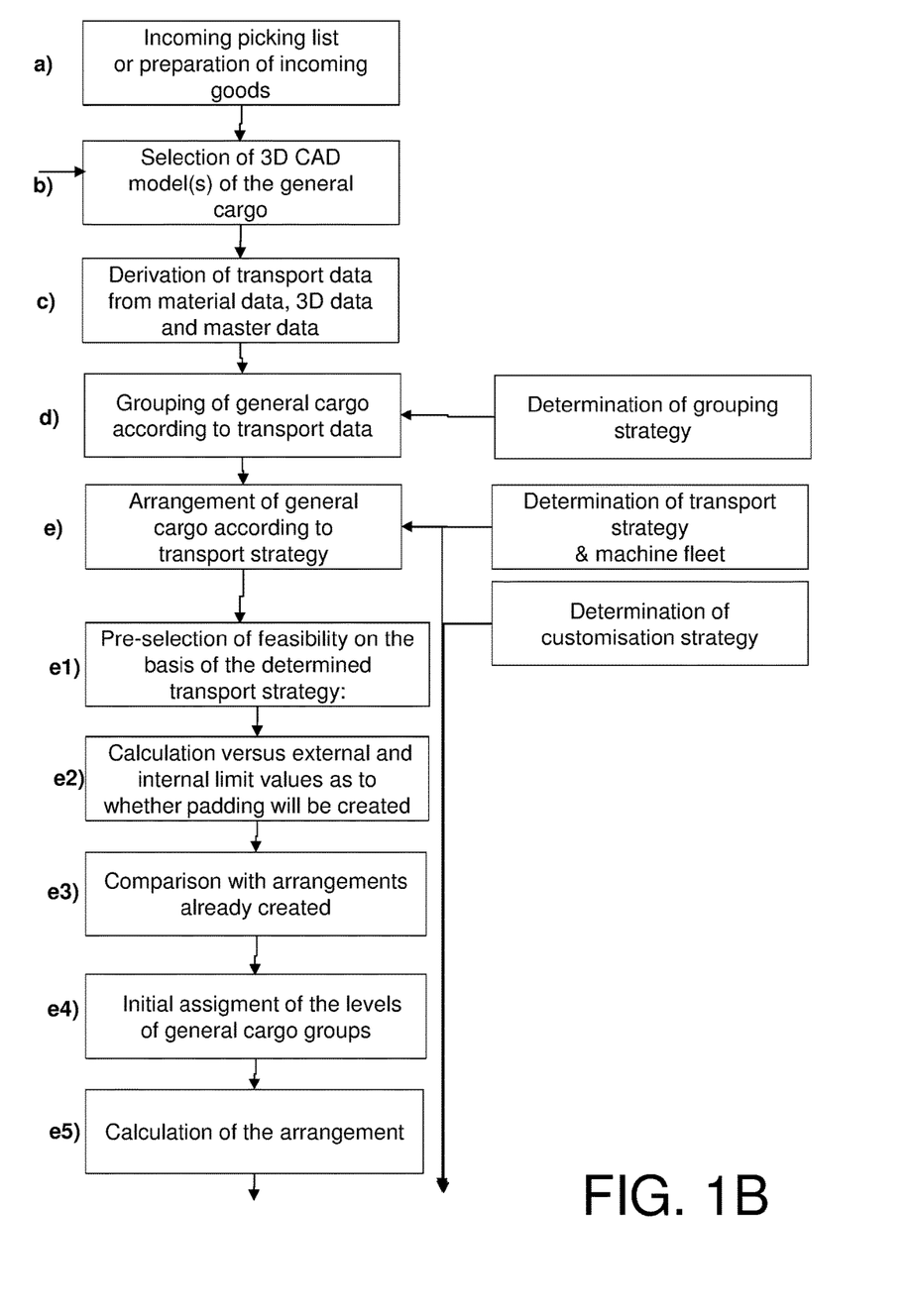
Figure 1C:
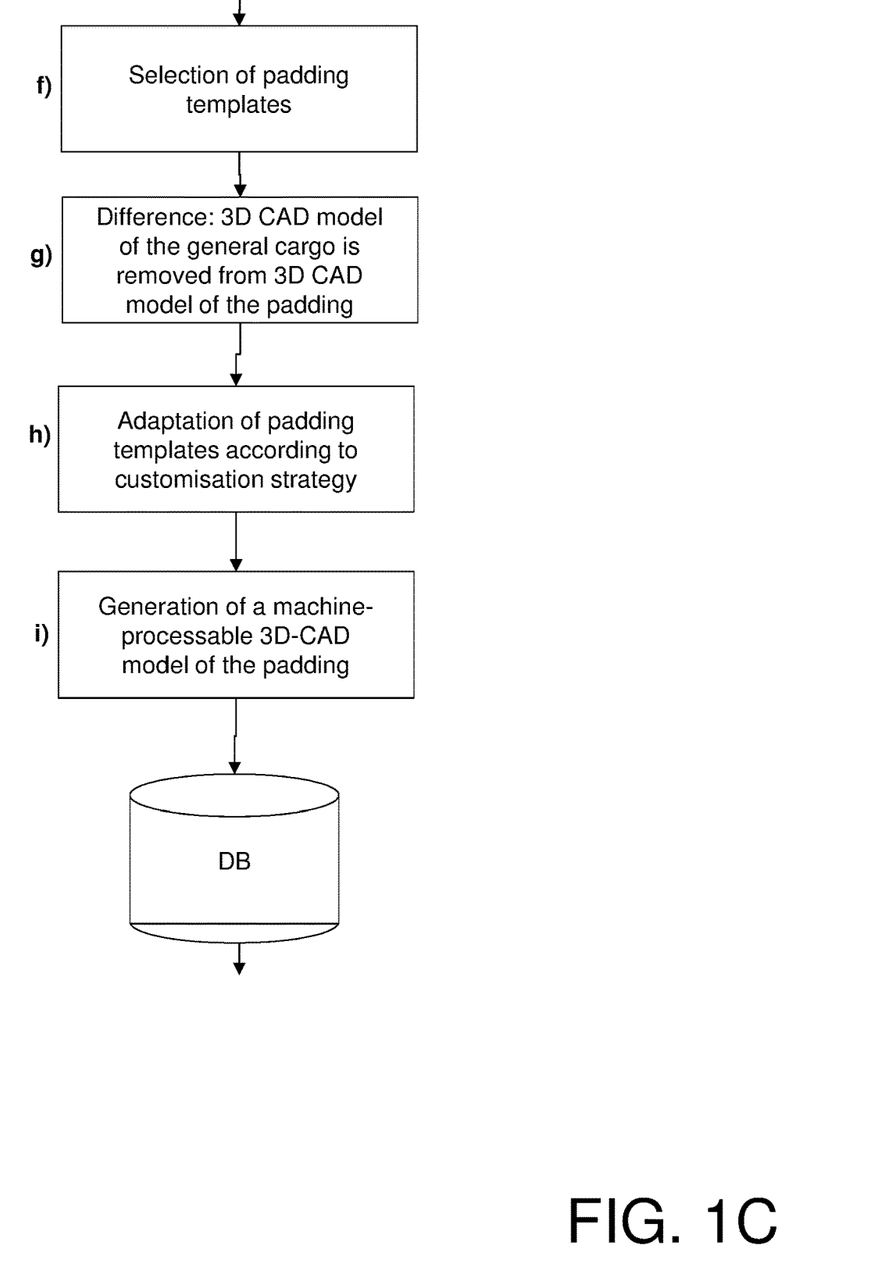
Figure 1D:
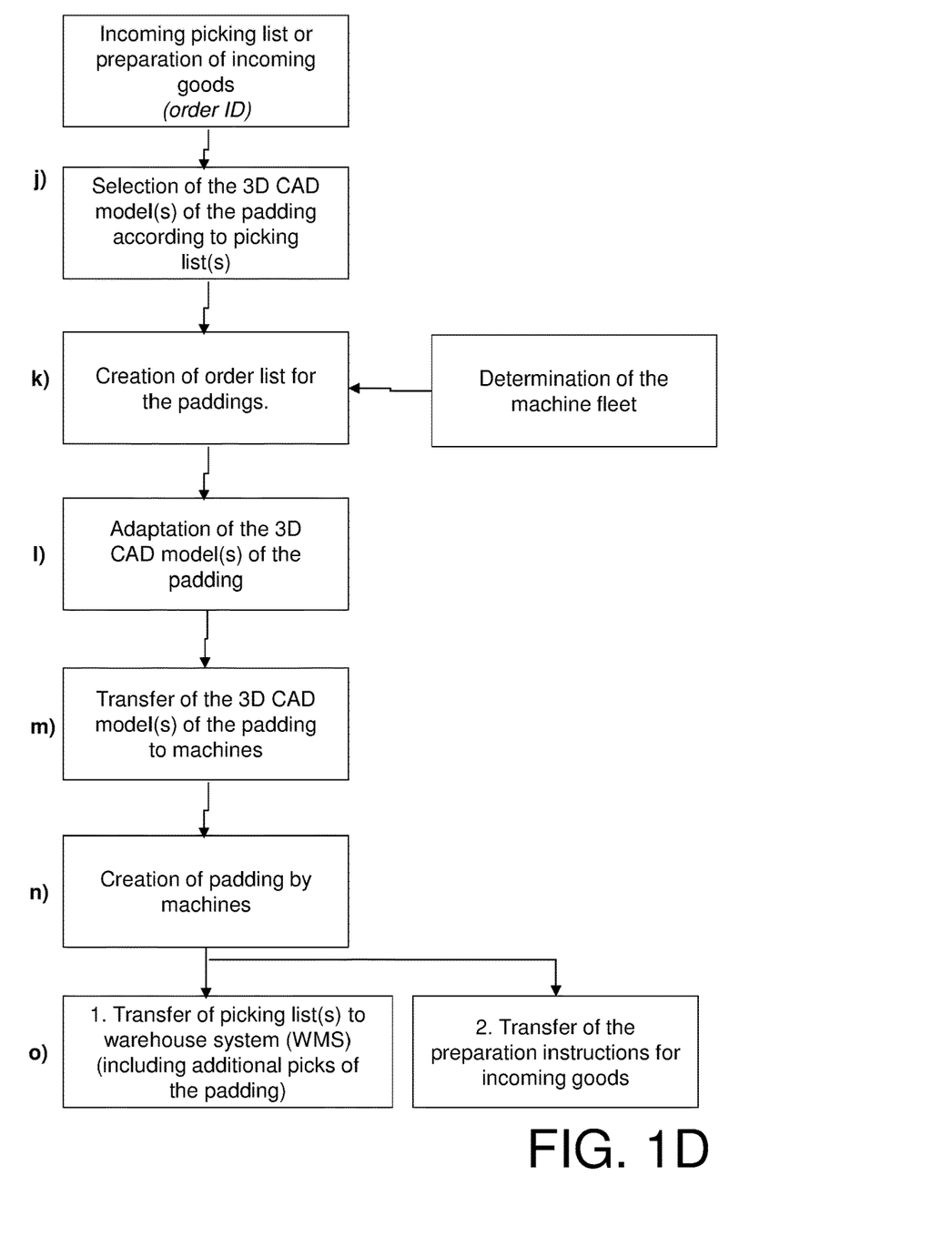

In a first step a), illustrated in FIG. 1B, a picking order and/or a storage list comprising the item of general cargo 2 or a plurality of items of general cargo 2 and in particular delivery data for each item of general cargo 2 and/or a labelling for each item of general cargo 2 are/is transferred to a computer 4. Here, the padding 1 can be created at the time of picking or at the time of an order for despatch, or the padding 1 is created at the time of storage or as the goods arrive and are stored.

In the subsequent step b), 3D data of a 3D model and material data for each item of general cargo 2 is determined by transfer from a database 5 and/or by three-dimensional scanning of the general cargo 2 by means of a 3D scanner 6, as can be seen in FIG. 1A. The 3D data of a 3D CAD model and material data for the general cargo 2 can be obtained from a manufacturer of the general cargo 2 and can be stored in the database 5. The 3D data of the general cargo 2 constitutes a data object and includes external volume dimensions of the general cargo 2, such as width, length, height or cubic centimeters, volume primitive shape, such as cone, cylinder, wedge, sphere, rectangle or pyramid, a 3D CAD model of the general cargo 2 and/or segmented extremities of the 3D CAD model of the general cargo 2. The material data of the general cargo 2 also constitutes a data object and includes metadata, such as value/amount and/or article ID, which can be generated from a barcode, etc. and is used identically to the general cargo ID, and material data such as hazardous material, hazardous material category or hazard designation, Carcinogenic, Mutagenic and toxic to Reproduction (CMR) substances and category, fragility, total weight, liquid content, temperature specification, viscosity, consistency and/or field strength.

In step c) the general cargo 2 is sorted by means of a first neural network into an existing transport category where applicable or into a transport category that is to be created, wherein a categorisation is performed by the first neural network on the basis of the 3D data, the material data, and, if provided, on the basis of the master data of the general cargo 2. The master data constitutes a further data object of the general cargo 2 and includes information relating to a hazardous material, hazardous material category, such as hazard designation, CMR substances, total weight, temperature specification, expiration date, production date, value and/or product category. In the case of master data, step b) also includes obtaining the master data for each item of general cargo 2. The categorisation performed in step c) is stored in the database 5 or in a further database. The transport category constitutes a further data object and accordingly includes the properties constituted by hazardous product, hazardous product class, hazardous product class sub-category, weight protection, required impact resistance, upright position, fixing, critical extremities, moisture protection, absorbent additional material, target temperature, loose general cargo, collapsible, already padded, already in outer packaging and/or value. The sorting and classification of the general cargo 2 into the transport category is performed by the self-learning system of the first neural network by means of what is known as "deep learning (DL)". A validation by an authorised individual or a training of the neural network may also be necessary initially, wherein automated sorting is performed once a training phase is complete.

In the subsequent step d), the general cargo 2 is grouped into a general cargo group on the basis of the transport category and/or a general cargo ID, wherein the criteria for grouping can additionally comprise priority objects, group objects, primary object, secondary objects, accessibility, visibility, negative objects such as hazardous goods, and/or transport category, such as loose general cargo or value, as potential client-specific grouping strategy. In this respect, the grouping can be performed for example on the basis of the affiliation of a cable to a stereo system. The general cargo group constitutes a data object and accordingly includes the properties constituted by article ID of the primary object, article ID of the multiple secondary objects as necessary, name of the common transport category, the joint value amount, common accessibility, common priority objects, joint weight and/or joint volume.

In step e) the general cargo group is arranged virtually in the outer packaging on the basis of the transport strategy. For this purpose, a volume of the general cargo group is firstly calculated in a first sub-step e1) in respect of a standard size of the outer packaging 3 and in respect of a pre-sorting on the basis of a determined transport strategy as pre-selection of the padding so as to make a pre-selection of feasibility on the basis of the determined transport strategy. The transport strategy constitutes a client-specific (as necessary) data object and includes the properties constituted by packing target, such as standard size, reusable packaging, recyclable padding, pre-selection and/or shipping method and also the allocations of packaging names and volumes thereof, and associations to the provided transport categories with preferred shipping method, such as merchandise shipment, book shipment, express, with defined customisation, such as serial number, greeting, with defined maximum time period of a padding creation, with defined maximum time period of a picking process and/or with defined maximum material value of the padding.

In the second sub-step e2), it is checked, in relation to at least one limit value, whether the pre-selection of the padding can be created, in particular comprising a creation of a production sequence of the padding in accordance with an available machine fleet, a required period of time, a value and/or a splitting of the sequence into a number of print orders as necessary. The machine fleet of the padding machines 7 for example comprises, as necessary, a number of 3D printers, trimmers, presses, box-folding machines and/or injection moulding machines.

In sub-step e3) a comparison is made as to whether arrangements of items of general cargo 2 having the same transport category, number of general cargo groups and/or total or joint volumes have already been created for the pre-selection of the padding. Since a calculation of the arrangement requires a high processing power, a search is performed for previously known arrangements. In sub-step e4) an initial arrangement of the general cargo in a level in the grid dimension of the general cargo group is performed. Then, in sub-step e5), the initial arrangement is optimised by means of a threshold accepting algorithm, great deluge algorithm, metropolis algorithm, morphological, evolutionary and/or genetic algorithm in order to obtain the virtual arrangement.

The criteria for the virtual arrangement of the general cargo groups in step e) thus include, for example, the number of general cargo groups, a rough calculation of volume versus transport strategy and packing target, a joint value versus transport strategy and limit values, available padding machines 7 versus transport strategy and limit values, and/or an initial assignment of a level, such as upper levels in particular for joint priority objects and/or joint accessibility, and lower levels in particular for the largest joint weight.

In other words, the arrangement methods or algorithms initially include the question as to whether templates according to joint transport category and number of general cargo groups are available. Otherwise, the template is adapted or a new calculation is performed by grid dimension logic by "simulated annealing" heuristic optimisation algorithms, such as threshold accepting, great deluge algorithm or metropolis algorithm. On the basis of material data and dimensions, it is also possible to check whether simple basic shapes are provided, for example so as to place loose general cargo or special cargo, such as food, in compartments or so as to provide presentation trays, for example for shoes. When calculating the arrangement, it is checked by morphological or evolutionary/genetic algorithms whether complex shapes are provided, whether a rough volume of the general cargo 2 is close to the postal charge limit, etc. The arrangement of the general cargo is also a data object and includes the properties constituted by grid dimension logic, i.e. potentially multiple vertical levels, potentially multiple horizontal levels with potentially multiple general cargo groups, calculated arrangement of the total volume, and potentially multiple general cargo groups and/or coordinates and orientation of the 3D CAD model of the general cargo 2.

In step f) a 3D CAD model of a padding template is selected for the general cargo group by means of a second neural network on the basis of the virtual arrangement created in step e). Here, the selection is made on the basis of the previously determined transport strategy, the available machine fleet, a customisation strategy and/or a picking order and/or a storage list. The customisation strategy constitutes a data object and includes information relating to a surface of the padding depending on transport category, finishing, such as textures, colour or relief, messages printed onto the padding as necessary, such as texts, images/graphics, codings, barcodes, such as QR codes, numbers, for example serial numbers, order IDs, tracking codes, or radio codes, such as NFC. As is also the case with the first neural network, the selection is made by the self-learning system of the second neural network by means of what is known as "deep learning (DL)". The validation can initially also be performed by an authorised individual, or a training of the neural network may be necessary. When a training phase is complete, selection is made in an automated manner. The padding template again constitutes a data object which has the properties constituted by 3D CAD model of the padding template, areas for customisation/messages and/or possible type of customisation/messages. The customisation strategy, grouping strategy and transport strategy can be created and adapted in a client-specific manner via a user interface of a computer or a website.

In the subsequent step g), a difference, a break and/or an association between the virtual arrangement of the general cargo group in the selected 3D CAD model of the padding template, the 3D CAD model of the general cargo and coordinates and orientation of the 3D model of the general cargo, and the 3D CAD model of the selected padding template is determined as 3D CAD model of a virtual padding. The difference is determined, for each padding or general cargo group, on the basis of the 3D CAD model of the padding template, the general cargo group possibly with general cargo group ID, the 3D CAD model of the general cargo 2, and also the coordinates and orientation of the 3D CAD model of the general cargo 2.

In step h) the 3D CAD model of the virtual padding is adapted in respect of the customisation strategy of the general cargo 2, selected from a surface finishing, a labelling, a coding and/or an electronic circuit of the general cargo. In addition, messages can be inserted into the 3D CAD model of the virtual padding. The 3D CAD data of the virtual padding includes, for each padding or general cargo group, information relating to the volume of primitive shape, such as cone, cylinder, wedge, sphere, rectangle or pyramid, the external volume dimensions, such as width, length, height or cubic centimeters, the 3D CAD model of the accordingly adapted padding, and also, if provided, customisation messages.

In the subsequent step i), a machine-processable 3D CAD model for the padding machine 7 is generated from the 3D CAD model of the virtual padding, in particular by removing faults, holes, unnecessary intermediate steps and/or unassociated vertices, and storing the 3D CAD model of the virtual padding in the database 5 and/or a further database. In other words, the 3D CAD model of the virtual padding is corrected of faults and is then for example reduced in terms of data by removing any intermediate steps no longer necessary. In step j) an order to produce the padding and to call up, from the database 5, the 3D CAD model of the virtual padding corresponding to the order is obtained as part of a picking order and/or a storage list. The order can be implemented by a picking list or preparation for incoming goods.

In step k) an order list of the paddings to be produced is created and general cargo IDs are assigned to the paddings to be produced, in particular depending on the available machine fleet, the required period of time, the value and/or the fragmentation of the sequence. In the following step l), the general cargo ID is added to the 3D CAD model of the virtual padding in order to adapt the 3D CAD model of the padding. By means of step m), 3D CAD model of the virtual padding created in this way is transferred to the padding machine 7, for example via Internet, network, wirelessly and/or in a wired manner. In step n) the padding is created from the 3D CAD model of the virtual padding 1 by means of the padding machine 7. As described beforehand, the padding machine 7 can be embodied as a 3D printer, trimmer, cutter, press, stamping machine, thermoformer and/or box-folding machine.

Once the padding 1 has been created, this is inserted in step o') either into the outer packaging 3, and the general cargo 2 is inserted into the created padding 1. By means of a packing machine 8, the outer packaging 3 is closed. Alternatively, in step o") the general cargo 2 is inserted into the created padding 1 and the general cargo 2 inserted into the padding 1 is stored. Once the general cargo 2 inserted into the padding 1 has been removed from storage, it is inserted into the outer packaging 3, and the outer packaging 3 is closed by means of the packing machine 8. Lastly, in step p), the closed outer packaging 3 is transferred to a logistics service provider so that the general cargo 2 can be delivered to the recipient thereof.

LIST OF REFERENCE SIGNS padding 1
general cargo 2
outer packaging 3
computer 4
database 5
3D scanner 6
padding machine 7
packing machine 8

We claim:
1. A method for producing a padding with a padding machine, wherein the padding is for transporting general cargo in an outer packaging, comprising the following steps carried out by a computer, a three-dimensional (3D) scanner and/or the padding machine:
   b) with the computer by transfer from a database and/or with the padding machine by transfer from a database and/or by three-dimension scanning of the general cargo with the 3D scanner, obtaining 3D data of a 3D CAD model and material data for each item of general cargo, wherein material data is selected from the group consisting of hazardous material, hazardous material category, hazard designation, Carcinogenic, Mutagenic and toxic to Reproduction (CMR) category, fragility, liquid content, temperature specification, viscosity, consistency and field strength, c) with the computer and/or the padding machine, sorting the general cargo by means of a first neural network into an existing transport category or into a newly created transport category, wherein the general cargo is categorised by the first neural network on the basis of the 3D data and the material data, wherein the transport category is selected from the group consisting of hazardous product, hazardous product class, hazardous product class sub-category, weight protection, required impact resistance, upright position, fixing, critical extremities, moisture protection, absorbent additional material, target temperature, loose general cargo, collapsible, already padded, already in outer packaging and value, d) with the computer and/or the padding machine, grouping the general cargo into a general cargo group on the basis of the transport category and/or a general cargo identifier (ID), e) with the computer and/or the padding machine, virtually arranging the general cargo group in the outer packaging, e1) with the computer and/or the padding machine, calculating a volume of the general cargo group with regard to a pre-defined size of the outer packaging and with regard to a pre-sorting on the basis of a determined transport strategy as pre-selection of the padding, e2) with the computer and/or the padding machine, checking, in relation to at least one limit value, whether the pre-selection of the padding can be created, e3) with the computer and/or the padding machine, comparing the pre-selection of the padding with arrangements, already created, of items of general cargo having the same transport category, number of general cargo group and/or total or joint volumes, f) with a second neural network in the computer and/or the padding machine, selecting a 3D CAD model of a padding template for the general cargo group on the basis of the transport category and the virtual arrangement, g) with the computer and/or the padding machine, calculating a difference, a break and/or an association between the virtual arrangement of the general cargo group in the selected 3D CAD model of the padding template, the 3D CAD model of the general cargo and the coordinates and orientation of the 3D CAD model of the general cargo, and the 3D CAD model of the selected padding template as 3D CAD model of a virtual padding, n) controlling the padding machine and producing the padding from the 3D CAD model of the virtual padding.

2. The method according to claim 1, comprising the following step:
a) transferring a picking order and/or a storage list comprising the item of general cargo or a plurality of items of general cargo before performing step b, and/or wherein step b) also comprises the acquirement of master data for each item of general cargo and the categorisation in step c) is performed on the basis of the master data, and/or the categorisation in step c) is stored in the database.

3. The method according to claim 1, comprising the following step:
a) transferring a picking order and/or a storage list comprising the item of general cargo or a plurality of items of general cargo and delivery data for each item of general cargo and/or a labelling for each item of general cargo, and/or wherein step b) also comprises the acquirement of master data for each item of general cargo and the categorisation in step c) is performed on the basis of the master data, and/or the categorisation in step c) is stored in the database.

4. The method according to claim 1, wherein step e) further comprises the steps of:
e4) initially arranging the general cargo in a level in the grid dimension of the general cargo group, and
e5) optimising the initial arrangement with a threshold accepting algorithm, great deluge algorithm, metropolis algorithm, morphological, evolutionary and/or genetic algorithm in order to obtain the virtual arrangement.

5. The method according to claim 1, wherein step e2) comprises the creation of a production sequence for the padding depending on an available machine fleet, a required period of time, a value and/or a fragmentation of the sequence into a number of print orders.

6. The method according to claim 1, wherein the selection in step f) is performed on the basis of a transport strategy, an available machine fleet, a customisation strategy and/or a picking order and/or a storage list.

7. The method according to claim 1, comprising the following step:
h) adapting the 3D CAD model of the virtual padding in respect of a customisation strategy of the general cargo.

8. The method according to claim 1, comprising the following step:
h) adapting the 3D CAD model of the virtual padding in respect of a customisation strategy of the general cargo, selected from a surface finishing, a labelling, a coding and/or an electronic circuit on the padding.

9. The method according to claim 1, comprising the following step:
i) generating a machine-processable 3D CAD model for the padding machine from the 3D CAD model of the virtual padding, and storing the 3D CAD model of the virtual padding in the database.

10. The method according to claim 1, comprising the following step:
i) generating a machine-processable 3D CAD model for the padding machine from the 3D CAD model of the virtual padding, by removing faults, holes, intermediate steps, and storing the 3D CAD model of the virtual padding in the database.

11. The method according to claim 9, comprising the following step:
j) obtaining an order for production of the padding as part of a picking order and/or a storage list and calling up, from the database, the 3D CAD model of the virtual padding corresponding to the order.

12. The method according to claim 11, comprising the following step:
k) creating an order list of the paddings to be produced and assigning general cargo IDs to the paddings to be produced,
l) adding the general cargo ID to the 3D CAD model of the virtual padding, and/or
m) transferring the 3D CAD model of the virtual padding to the padding machine.

13. The method according to claim 11, comprising the following step:
k) creating an order list of the paddings to be produced and assigning general cargo IDs to the paddings to be produced, depending on an available machine fleet, a required period of time, a value and/or a fragmentation of the sequence,
l) adding the general cargo ID to the 3D CAD model of the virtual padding, and/or
m) transferring the 3D CAD model of the virtual padding to the padding machine.

14. The method according to claim 1, comprising the following step:
o1) with a packing machine, inserting the padding into the outer packaging and inserting the general cargo into the padding and closing the outer packaging, or
o2) with the packing machine, inserting the general cargo into the padding, storing the general cargo inserted into the padding, removing from storage the general cargo inserted into the padding, inserting the general cargo inserted into the padding into the outer packaging and/or closing the outer packaging.

15. The method according to claim 1, comprising the following step:
p) transferring the closed outer packaging to a logistics service provider for delivery to a recipient of the general cargo.

16. The method according to claim 1, wherein the padding machine is embodied as a 3D printer, trimmer, cutter, press, stamping machine, thermoformer and/or box-folding machine.

17. The method according to claim 1, wherein the general cargo group is selected from the group consisting of priority objects, group objects, primary object, secondary objects, accessibility, visibility, hazardous goods, value, client specific grouping strategy and transport category.

18. The method according to claim 1, further comprising, with a packing machine, inserting the padding into the outer packaging.

19. The method according to claim 1, further comprising, with a packing machine, inserting the general cargo into the padding.

20. The method according to claim 1, further comprising creating a production sequence of the padding in accordance with an available machine fleet, a required period of time, and/or a value.

* * * * *